(12) United States Patent
Polishuk et al.

(10) Patent No.: US 12,475,049 B2
(45) Date of Patent: Nov. 18, 2025

(54) DEVICE, SYSTEM AND METHOD FOR PROVIDING A HIGH AFFINITY SNOOP FILTER

(71) Applicant: Intel Corporation, Santa Clara, CA (US)

(72) Inventors: Leon Polishuk, Haifa (IL); Oz Shitrit, Tel Aviv (IL); Elyada Bar-Chaim, Haifa (IL); Mauricio Valverde Monge, Hillsboro, OR (US); Ayan Mandal, Bangaluru (IN)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 17/705,015

(22) Filed: Mar. 25, 2022

(65) Prior Publication Data

US 2023/0305960 A1    Sep. 28, 2023

(51) Int. Cl.
    *G06F 12/0815*     (2016.01)
    *G06F 12/0811*     (2016.01)
    *G06F 12/0831*     (2016.01)
    *G06F 12/0864*     (2016.01)

(52) U.S. Cl.
    CPC ...... *G06F 12/0815* (2013.01); *G06F 12/0811* (2013.01); *G06F 12/0833* (2013.01); *G06F 12/0864* (2013.01)

(58) Field of Classification Search
None
See application file for complete search history.

(56) References Cited

U.S. PATENT DOCUMENTS

| | | | |
|---|---|---|---|
| 6,704,845 B2 | 3/2004 | Anderson et al. | |
| 6,959,364 B2 | 10/2005 | Safranek et al. | |
| 7,047,374 B2 | 5/2006 | Sah et al. | |
| 7,380,071 B2 | 5/2008 | Blumrich et al. | |
| 7,383,398 B2 | 6/2008 | Looi et al. | |
| 7,581,068 B2 | 8/2009 | Gilbert et al. | |
| 7,962,694 B2 | 6/2011 | Chinthamani et al. | |
| 8,255,638 B2 | 8/2012 | Blumrich et al. | |
| 9,058,272 B1 * | 6/2015 | O'Bleness | G06F 12/0831 |
| 2003/0135696 A1 * | 7/2003 | Rankin | G06F 12/123 |
| | | | 711/E12.072 |
| 2014/0095806 A1 | 4/2014 | Fajardo et al. | |
| 2020/0119753 A1 * | 4/2020 | Chirca | G06F 3/0658 |
| 2023/0139212 A1 * | 5/2023 | Randall | G06F 12/0833 |
| | | | 711/118 |
| 2025/0110880 A1 * | 4/2025 | Palfer-Sollier | G06F 12/0833 |

* cited by examiner

*Primary Examiner* — Kaushikkumar M Patel
(74) *Attorney, Agent, or Firm* — Essential Patents Group, LLP

(57) ABSTRACT

Techniques and mechanisms for efficiently providing access to cached data. In an embodiment, a cache coherency engine comprises circuitry to provide a snoop filter which stores entries each corresponding to a respective line of one or more caches. The one or more caches comprise a first cache which includes a first set, and the snoop filter includes a first plurality of sets which are each configured to be available to represent a line of the first set. In another embodiment, the one or more caches comprise multiple caches which each comprise a respective first set, wherein, for each set of the first plurality of sets, any line in the multiple caches which is to be represented by that each set is to be a line in the respective first sets of the multiple caches.

16 Claims, 16 Drawing Sheets

| Tag 401 | MESI state 402 | Validity bits 403 | Pointer 404 | LRU 405 |

550 

560
Selecting a first way from among all of multiple cache ways which each meet one or more test criteria

562
Selecting a second way from among only those of the multiple ways which are each represented by a first snoop filter set

564
Where it is determined that only a cache victim is needed, selecting the first way over the second way to be a victim

566
Where it is determined that both a cache victim and a snoop filter victim is needed, selecting the second way over the first way to be the victim

FIG. 5B

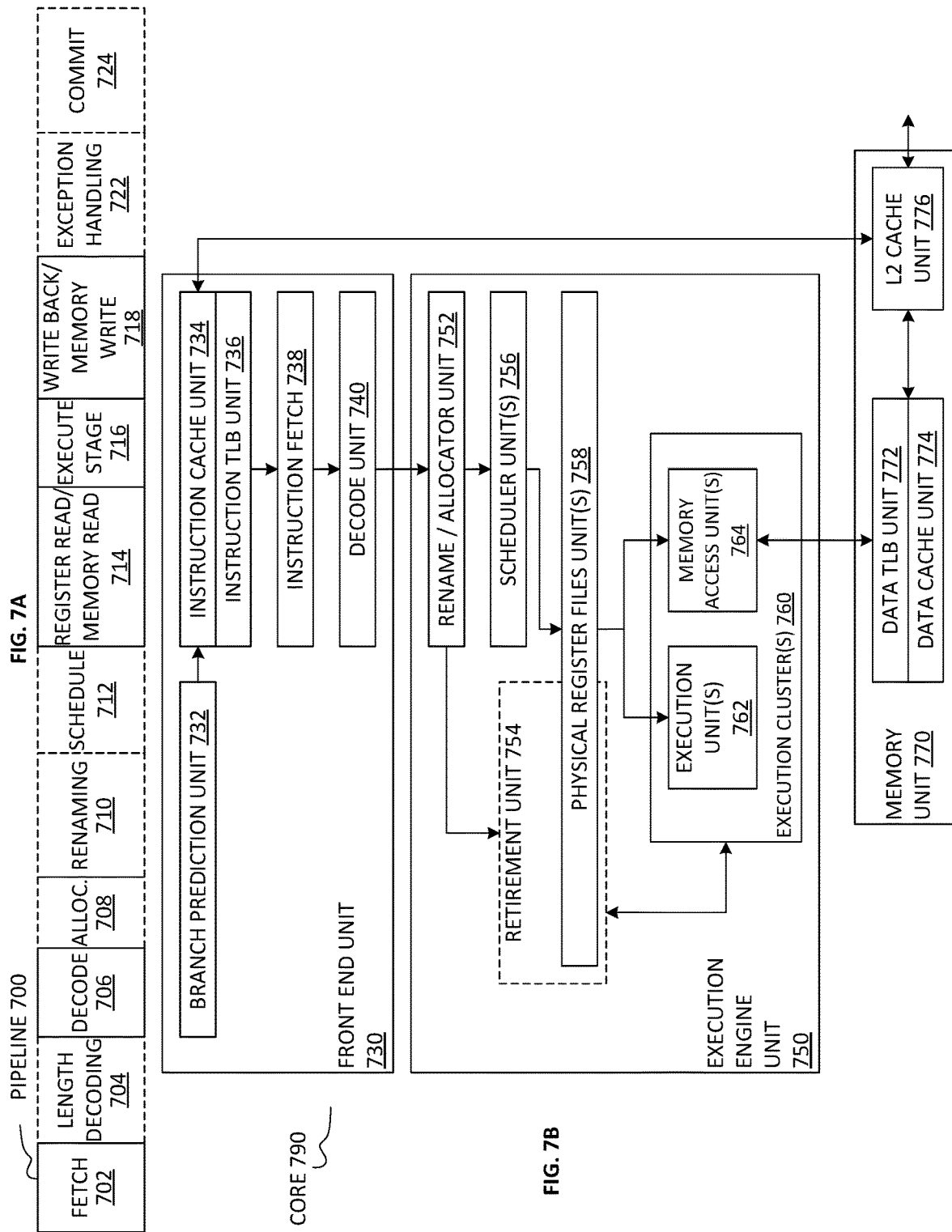

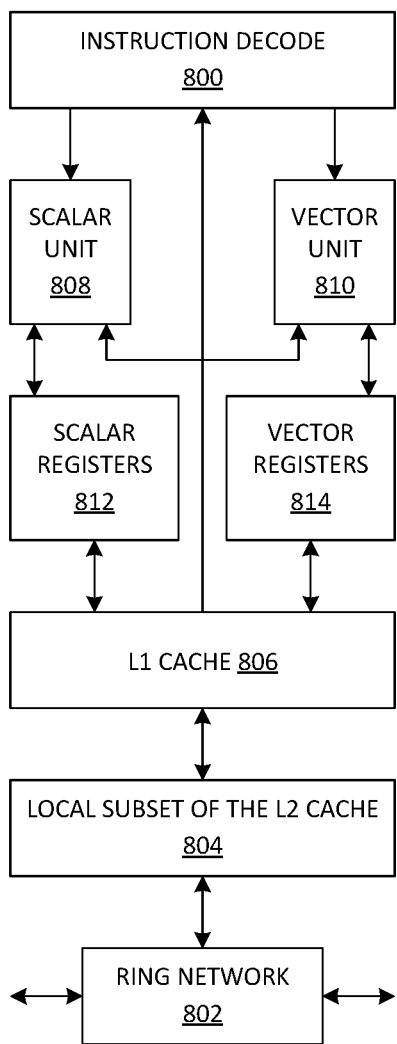
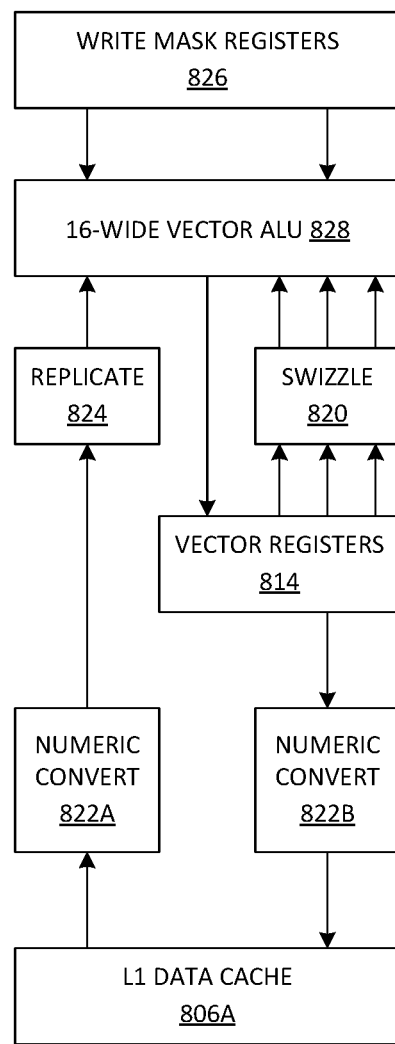
FIG. 8A
FIG. 8B

DEVICE, SYSTEM AND METHOD FOR PROVIDING A HIGH AFFINITY SNOOP FILTER

BACKGROUND

1. Technical Field

This disclosure generally relates to data cache systems and more particularly, but not exclusively, to an organization of snoop filter information.

2. Background Art

A conventional multi-processor system typically has multiple caches, where each such cache is to keep a copy of a piece of data stored in memory. Problems arise when multiple data copies in the caches are not coherent. Various techniques have been developed to ensure data coherency. For example, when the data in one cache is modified, other copies of the data are marked as invalid so that they will not be used.

A copy of data in the cache is often referred to as a cache line, a memory line, or a line. A snooping operation refers to the process in which an agent of a bus monitors the bus for memory transactions, e.g., a read/write operation to access data which—potentially—resides in a cache in addition to being in main memory. The agent records the states of the cache lines involved in the memory transactions in a directory which supports "snoop filter" functionality. Typically, the state of a given cache line indicates whether the line has only one valid copy outside of the main memory, has multiple valid copies shared by multiple caches, or has been invalidated. A data entry in the snoop filter directory is often indexed by its address in the main memory.

As successive generations of processor architectures continue to scale in size, complexity and speed, there is expected to be an increasing demand placed on improvements to the provisioning of cached information.

BRIEF DESCRIPTION OF THE DRAWINGS

The various embodiments of the present invention are illustrated by way of example, and not by way of limitation, in the figures of the accompanying drawings and in which:

FIGS. 5A, 5B show flow diagrams each illustrating features of a respective method to access to a snoop filter according to a corresponding embodiment.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention;

FIGS. 8A through 8B illustrate a block diagram of a more specific exemplary in-order core architecture, which core would be one of several logic blocks (including other cores of the same type and/or different types) in a chip;

DETAILED DESCRIPTION

Figure 1:
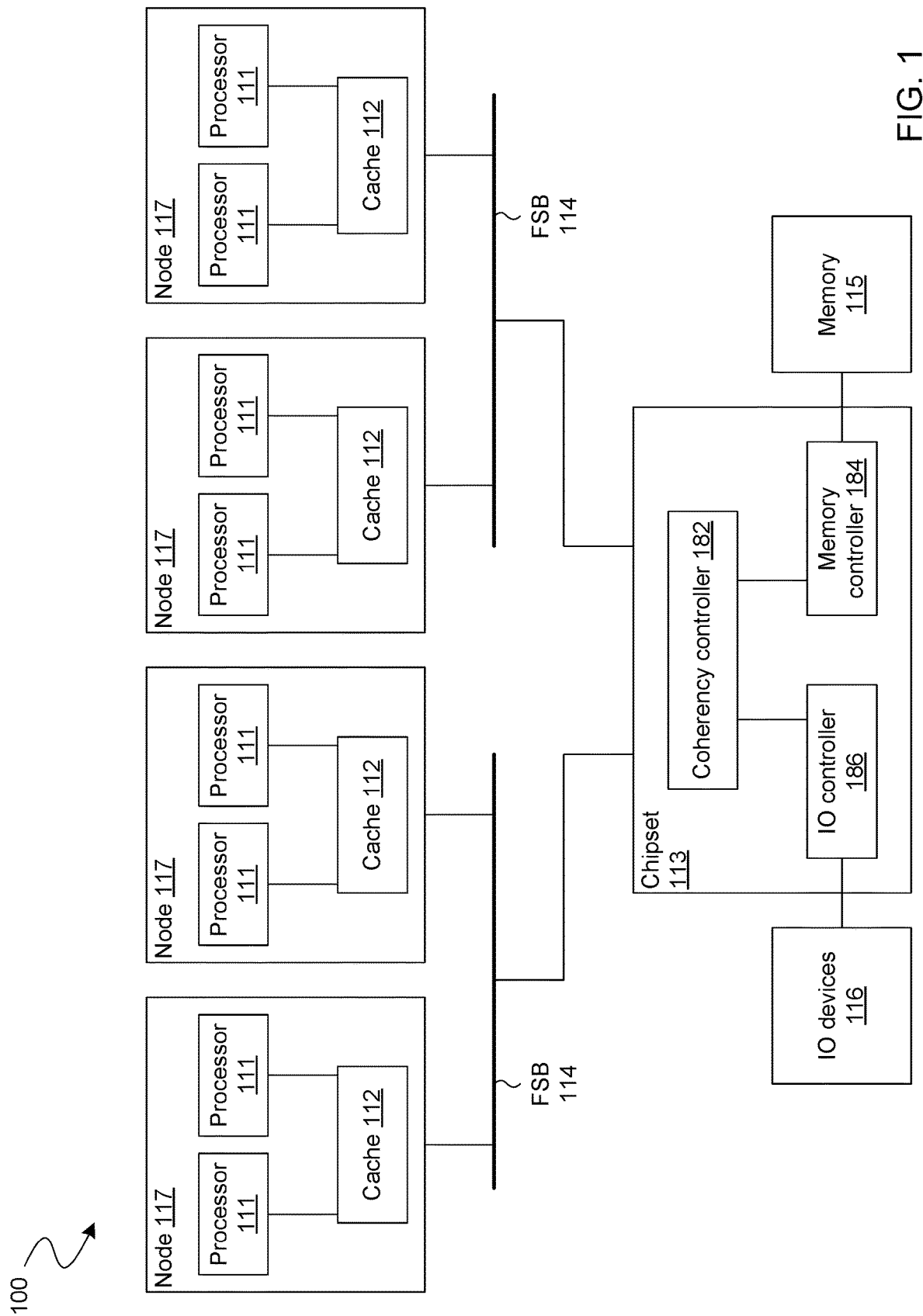
FIGS. 1 and 2 show functional block diagrams each illustrating respective features of a system to provide snoop filter functionality according to an embodiment.

Embodiments discussed herein variously provide techniques and mechanisms for efficiently providing access to cached data. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry which supports snoop filter functionality.

Referring to FIG. 1, an embodiment of a multi-processor system 100 comprises a plurality of processing nodes 117 interconnected with a chipset 113. Each of the processing nodes 117 includes one or more processors 111 (two processors per processing node are shown) and a cache 112. Each cache 112 is locally accessibly by processors 111 of a "home node" (the processing node in which this cache is located), and remotely accessible by processors 111 of "remote nodes" (the processing nodes other than the home node). Cache 112 is referred to as a "local cache" with respect to processors 111 of the home node. Processing nodes 117 are coupled to chipset 113 via two or more front side buses (FSBs) 114 (only two FSBs are shown) or other types of data paths (e.g., point-to-point connections). One or more of processing nodes 117 is implemented on a single chip. System 100 is used as a server system, in some embodiments, because of the high collective processing power it possesses. However, system 100 is also used as desktop computers or any of various other computing systems.

In an embodiment, chipset 113 includes a coherency controller 182 for processing requests received from FSBs 114 and maintaining data coherency among caches 112. One example of various functions of coherency controller 182 are described in detail below with reference to FIG. 2. Chipset 113 includes a memory controller 184 for providing processing nodes 117 and other components of system 100 with access to storage locations of a memory 115. Memory 115 comprises one or more types of memory devices such as, for example, dynamic random-access memory (DRAM) devices, synchronous dynamic random-access memory (SDRAM) devices, double data rate (DDR) SDRAM devices, or other volatile or non-volatile memory devices suitable for server or general applications.

Chipset 113 also includes an I/O controller 186 to provide an interface for processing nodes 117 and other components of system 100 to access to one or more I/O devices 116. In various embodiments, I/O devices 116 include one or more Industry Standard Architecture (ISA) devices, Peripheral Component Interconnect (PCI) devices, PCI Express devices, Universal Serial Bus (USB) devices, Small Computer System Interface (SCSI) devices, and/or any of various other standard or proprietary I/O devices suitable for server or general applications.

Processors 111 stores lines of memory in their respective local caches 112 to facilitate quick access. Caches 112 store data, instructions, or a combination of both. For each cache line, caches 112 store a tag (e.g., a portion of a memory address) to associate or map the cache line to a corresponding line in memory 115. Caches 112 also store and update a coherency state for each cache line. For example, caches 112 support a MESI coherency protocol in which a cache line has a modified (M) state, an exclusive (E) state, a shared (S) state, or an invalid (I) state. Some embodiments support operation with a MESIF coherency protocol—which further comprises a forward (F) state—and/or any of various other enhancements on the MESI protocol.

According to an example of the MESI coherency protocol, the invalid state (I) indicates that the associated cache line is not a current copy of the line—e.g., wherein the current copy of the line instead resides in memory 115 and/or one of the other caches 112 in the remote nodes. The shared state (S) indicates that the associated cache line is a current copy of the line, and that zero or more other caches 112 also have a current copy of the line in the shared state. The exclusive state (E) indicates that the cache 112 in which the associated cache line resides has obtained ownership of the line and has a current copy of the line. Further, the exclusive state indicates that no other cache 112 has a copy of the line in the modified, exclusive, or shared state. The modified state (M) indicates that the cache 112 in which the associated cache line resides has a current copy of the line which has been modified. Like the exclusive state, the modified state indicates that no other cache 112 has a copy of the line in the modified, exclusive, or shared state. Further, the modified state indicates that the associated line is more current than the corresponding data line in memory 115.

Figure 2:
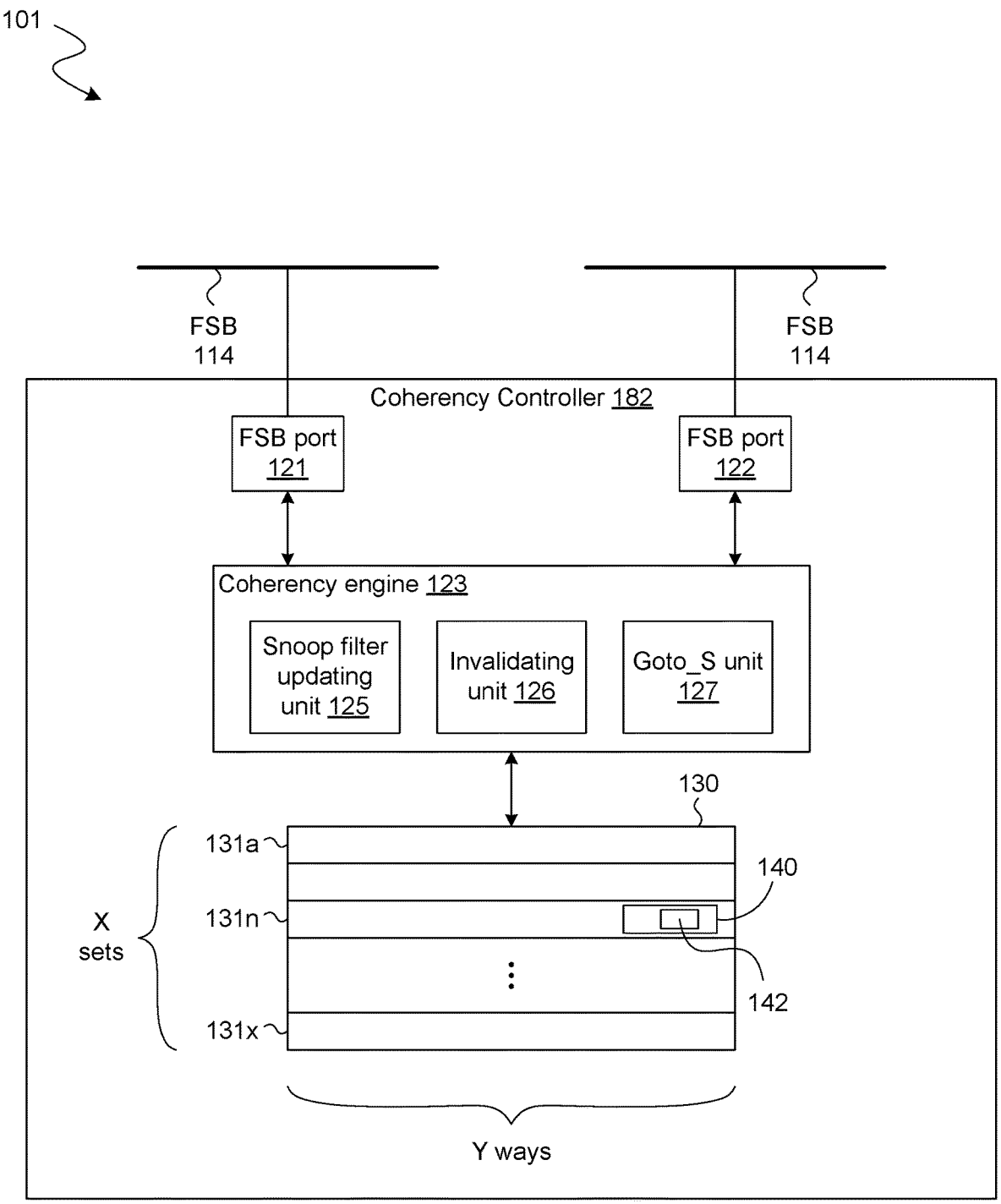

The states of cache lines are tracked by a centralized directory, e.g., a snoop filter or any other memory component in a centralized location of system 100. For example, FIG. 2 shows, in a detail view 101, one example of circuitry which is provided by system 100 according to some embodiments. Referring to FIG. 2, in one embodiment, coherency controller 182 includes a snoop filter 130 to provide coherency information of the cache lines. As shown in FIG. 2, an embodiment of coherency controller 182 comprises several FSB ports (FSB port 121 and FSB port 122), a coherency engine 123 and a snoop filter 130.

Snoop filter 130 comprises one or more storage arrays such as, for example, a fully associative array, set associative array, or a directly mapped array that comprise ways or lines to store coherency information. By way of illustration and not limitation, snoop filter 130 comprises a Y-way set associative array in which each of X sets includes Y slots (or "ways")—where X and Y are integers—for storing coherency information of Y cache lines. A given cache line is mapped to one of the X sets 131a, . . . , 131x by, for example, using the last ($\log_2 X$) bits of the memory address. Each way stores information for a corresponding line. For example, the illustrative way 140 shown in set 131n stores one or more of an address tag, coherency state bits 142, and (for example) a presence vector. The address tag comprises all or a portion of the line's memory address. In the above example where the last (log 2X) memory address bits are used to locate a set, the address tag is the rest of the memory address bits preceding those (log 2X) address bits. Coherency state bits 142 indicate a collective coherency state (e.g., M, E, S, or I) of the cache line associated with the address tag. In various embodiments, a presence vector indicates which FSB 114 connects to the cache 112 that might have the corresponding cache line.

In one embodiment, when a request for a memory transaction arrives at coherency controller 182, coherency engine 123 determines where to forward the request. A memory transaction refers to a transaction that requires access to memory 115 or any caches 112. Coherency engine 123 performs a lookup to determine whether snoop filter 130 has information of the requested line. If snoop filter 130 has the information, coherency engine 123 forwards the request—e.g., based on the presence vector of the line—to an FSB port (e.g., one of FSB ports 121 or 122) which connects to that cache 112 which has a current copy of the line. If the transaction might potentially change the state of the requested line, coherency engine 123 updates the information in snoop filter 130 to reflect the changes. If snoop filter 130 does not have information for the line, coherency engine 123 adds an entry to the snoop filter 130 to record coherency information of the requested line.

To support the storage of entries in snoop filter 130, coherency engine 123 implements a given sequencing rule to maintain data coherency. The sequencing rule decomposes the memory request types into read requests and write requests. Read requests are decoupled from write requests. Processors 111—and/or I/O devices 116, for example—issue the read requests and the write requests. For processor requests, write requests include write (also known as read for ownership) and write-invalidate. For each request type, different coherency actions are taken in the cases of a snoop filter hit and a snoop filter miss. Coherency engine 123 implements the sequencing rule by hardware or embedded firmware.

For each request type (e.g., read or write) and for each snoop filter result (e.g., hit or miss), coherency engine 123 takes a snoop filter action and/or a coherency action to maintain data coherency. A snoop filter action refers to an action of updating the snoop filter entries. A coherency action refers to an action of sending a snoop message to one or more processors to update the coherency states of the cache lines. In one embodiment, coherency engine 123 comprises circuits including a snoop filter updating unit 125, an invalidating unit 126, and a Goto_S unit 127 for implementing the snoop filter actions and the coherency actions.

In an illustrative scenario according to one embodiment, a processor requests to read a line from the main memory and the request results in a hit of an entry in snoop filter 130. For example, the entry which is hit is in an exclusive (E) state and the associated line is currently owned by a processor cache. Thus, the new read request from another processor will cause the line to exit the E state and enter the shared (S) state. Further, Goto_S unit 127 sends a "Goto_S" snoop message to inform the current owner of the line that the line has become shared. Thus, the current owner changes the state of the line from E to S.

Additionally or alternatively, in some embodiments, if a read request results in a miss in snoop filter 130, the requested entry is currently owned by zero or more caches. The current copy in the main memory is up-to-date and the new read request does not change that current state. Thus, snoop filter 130 is not updated and no coherency action is taken.

Additionally or alternatively, in some embodiments, if a processor requests to write a line to the main memory and the request results in a hit in snoop filter 130, snoop filter updating unit 125 updates the snoop filter entry to indicate that the requesting processor is the new owner of the line. Invalidating unit 126 sends an invalidating message to the current owner of the line to indicate that the current local copy is no longer up-to-date. Thus, an exclusive access right is granted to the requesting processor and the copy owned by the current owner is invalidated.

In another illustrative scenario according to an embodiment, a processor requests to write a line to the main memory, and the request results in a miss in snoop filter 130. Because the write request will cause the line to be exclusively owned by the requesting processor, snoop filter updating unit 125 allocates an entry of snoop filter 130 to the requested line. The copies of the line that are possibly cached outside of the main memory are invalidated. Thus, invalidating unit 126 issues an invalidating message to all of the processors to indicate that the current local copies are no longer up-to-date. As a result, an exclusive access right is granted to the requesting processor.

In another illustrative scenario according to an embodiment, a processor requests to write-invalidate a line. A write-invalidate operation is a write operation to the main memory in addition to invalidation of all copies in the processor's local cache. After the write-invalidate, the main memory holds the only current copy in the system. In one such embodiment, the associated snoop filter entry, if any, is deleted from snoop filter 130. Thus, if the write-invalidate request results in a hit in snoop filter 130, invalidating unit 126 sends an invalidating message to the current owner. If the write-invalidate request results in a miss, invalidating unit 126 sends an invalidating message to all of the processors to indicate that the copies outside of the main memory are no longer up to date. The result of the write-invalidate request is that no cache 112 has a copy of the line.

In conventional snoop filter architectures, each set of a given cache (or "cache set" herein) is represented by a different respective one and/only one set of a snoop filter (or "snoop filter set"). In this particular context, "represent," "represented," "representing," and related terms variously refer to the characteristic of a snoop filter set storing—or being available for selection to store—information (referred to herein as "coherency information") which describes a line in the given cache set.

Typically, one set of a traditional snoop filter includes enough ways to accommodate representing some respective first sets of a plurality of caches, wherein a cache coherency engine (or other suitable logic) prevents that same one snoop filter set from being able to further represent any other set of that plurality of caches. Such a snoop filter usually provides at least one additional set which is configured with enough ways to accommodate representing some respective second sets of that plurality of caches, wherein (similarly) the additional snoop filter set is prevented from being able to further represent any other set of that plurality of caches. Accordingly, the conventional practice is for snoop filters to provide either a one-to-one correspondence, or a many-to-one correspondence, between some one or more cache sets (each of a different respective cache), and the one—and only one—snoop filter set which is to be available to represent those one or more cache sets.

When an address is to be looked up in a snoop filter, all the ways of a particular set in that snoop filter are read and compared against some reference address information. These reads and comparison operations have an increasingly significant impact on system performance, as successive generations of integrated circuit technologies become more power constrained.

To mediate this power performance impact, some embodiments variously provide either a one-to-many correspondence, or a many-to-many correspondence, between some one or more cache sets (each of a different respective cache), and the multiple snoop filter sets which are to be available to represent those one or more cache sets. For example, in various embodiments, a snoop filter comprises a first plurality of sets which are each to be made available as a candidate for selection to store coherency information for a line which is to be stored in a first set of a first cache. However, in one such embodiment, each of the first plurality of sets is prevented from being a candidate for selection to store coherency information for a line which is to be stored in any other set of that same first cache. In various embodiments, such a first plurality of sets is available to represent one and only one set of a first cache and is further available to represent one and only one set of a second cache—e.g., wherein the first plurality of sets is dedicated to the respective first sets (and only the respective first sets) of multiple caches.

In providing such a one-to-many correspondence, or a many-to-many correspondence, between one or more cache sets, and multiple snoop filter sets, some embodiments accommodate the use of a snoop filter which has a relatively small number of ways per set (e.g., as compared to some existing snoop filter designs). At the same time, these embodiments further accommodate a relatively large total number of ways in the snoop filter being available (e.g., the same as used in some existing snoop filter designs) to store coherency information for a line in a given cache set. These embodiments thus improve the power efficiency of a snoop filter search, while at the same time maintaining a relatively high associativity of the snoop filter.

Figures 3, 4:
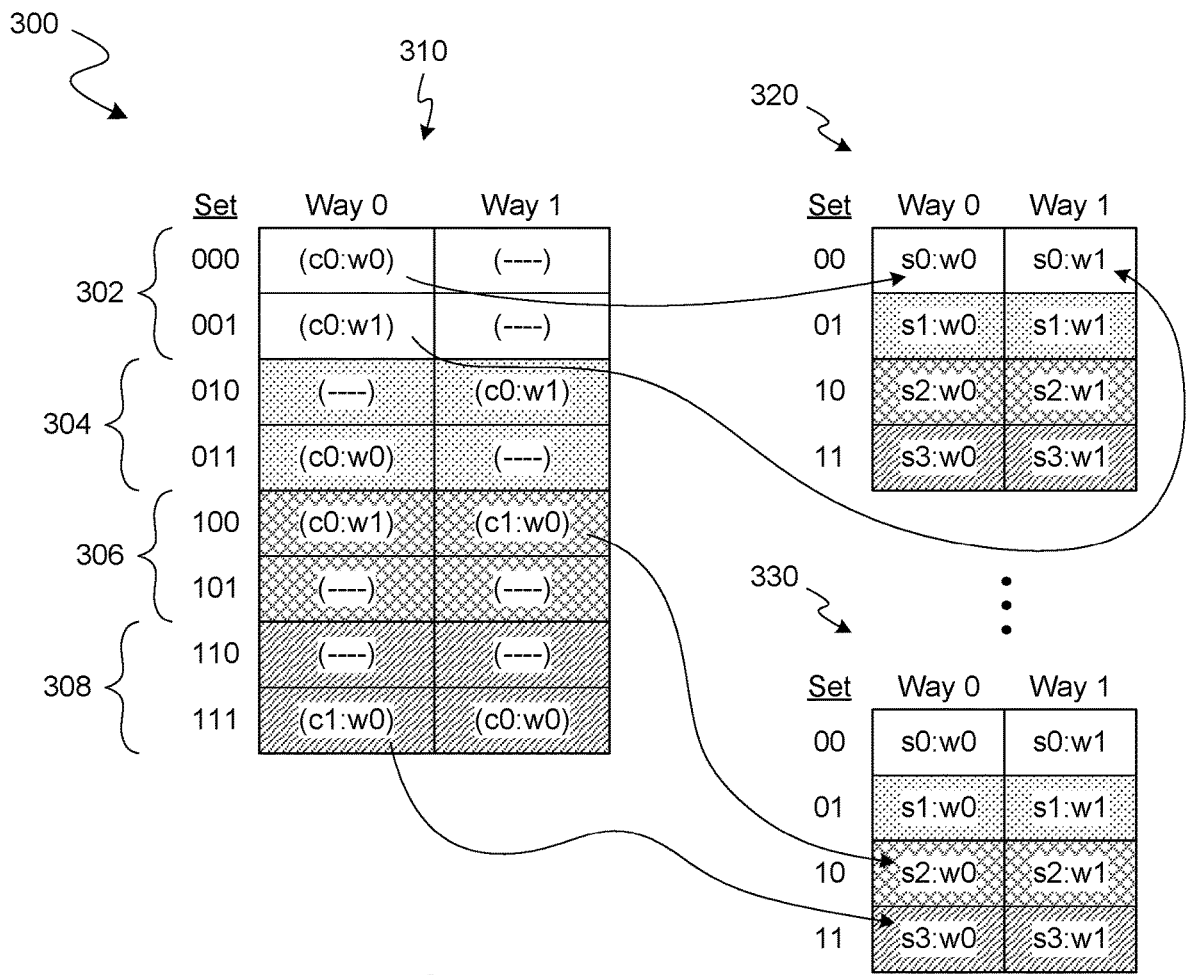
FIG. 3 shows a data diagram illustrating respective ways of a cache and of a snoop filter according to an embodiment.
FIG. 4 shows a data diagram illustrating a format of a snoop filter entry according to an embodiment.

By way of illustration and not limitation, FIG. 3 shows features of a system 300 to provide snoop filter functionality according to an embodiment. System 300 illustrates one example of an embodiment wherein, for a given cache, multiple sets of a snoop filter are each dedicated to only one set of that cache. In one such embodiment, system 300 provides functionality of system 100.

In the example embodiment shown, system 300 comprises a snoop filter 310 and one or more caches including, for example, the illustrative caches 320, 330 shown (e.g., wherein snoop filter 310 corresponds to snoop filter 130 and wherein caches 320, 330 each correspond to a respective one of caches 112). Snoop filter 310 includes sets which are each identified by a different respective sequence of tag bits. The sets of snoop filter 310 each include a respective two or more ways, which are available each to store coherency information for a respective line of the one or more caches. Similarly, caches 320, 330 each includes sets which are each identified by a different respective identifier—wherein the identifier each include a different respective sequence of bits.

To illustrate certain features of various embodiments, snoop filter 310 is shown as including eight sets which each comprise a respective way 0, and a respective way 1, wherein caches 320, 330 are shown as each including a respective four sets which each comprise a respective way 0 and a respective way 1. As used herein, the label "s000"

represents that set of snoop filter 310 which corresponds to the tag bit sequence "000"—e.g., wherein the label "s001" represents that set of snoop filter 310 which corresponds to the tag bit sequence "001," etc. Furthermore, the label "s0" herein represents that set of cache 320 (or of cache 330) which corresponds to the identifier bit sequence "00," wherein "s1" represents a cache set which corresponds to the identifier bit sequence "01," wherein "s2" represents a cache set which corresponds to the identifier bit sequence "10," and wherein "s3" represents a cache set which corresponds to the identifier bit sequence "10."

Although snoop filter 310 is shown as including eight sets which each include a respective two ways, some embodiments are not limited with respect to the total number of sets in snoop filter 310 and/or the particular number of the ways in any one such snoop filter set. Furthermore, although cache 320 and cache 330 are each shown as including a respective four sets which each include a respective two ways, the total number of caches in system 300, the number of sets in any one such cache, and the particular number of the ways in any one such cache set, is merely illustrative and not limiting on some embodiments.

The label "s000:w0" herein represents a first way of the snoop filter set s000—e.g., wherein "s000:w1" represents the next subsequent way of the snoop filter set s000, wherein "s001:w0" represents a first way of a snoop filter set s001, etc. Furthermore, the label "s0:w0" herein represents a first way of a cache set s0—e.g., wherein "s0:w1" represents the next subsequent way of a cache set s0, wherein "s1:w0" represents a first way of a cache set s1, etc. Further still, the label "c0:w0" (for example) herein represents some first way of a cache c0—e.g., wherein the particular set of cache c0 which includes that first way w0 has yet to be determined.

In the example embodiment shown, sets 302 of snoop filter 310—i.e., set s000 and set s001—correspond to (e.g., are allocated to represent) cache sets including the set s0 of cache 320, and the set s0 of cache 330. For example, any cache line which is to be represented in a way of set s000, or in a way of set s001, is in a respective one of the set s0 of cache 320, the set s0 of cache 330, or the set s0 of any other cache (not shown) which is represented by sets 302.

Furthermore, sets 304 of snoop filter 310—i.e., set s010 and set s011—correspond to (e.g., are allocated to represent) cache sets including the set s1 of cache 320, and to the set s1 of cache 330. For example, any cache line which is to be represented in a way of set s010, or in a way of set s011, is in a respective one of the set s1 of cache 320, the set s1 of cache 330, or the set s1 of any other cache (not shown) which is represented by sets 304. Further, sets 306 of snoop filter 310 similarly each correspond to the respective sets s2 of caches 320, 330, wherein sets 308 of snoop filter 310 similarly each correspond to the respective sets s3 of caches 320, 330.

At a given time during operation of system 300, a given set of snoop filter 310 includes coherency information for one or more lines of the one or more caches illustrated by caches 320, 330. By way of illustration and not limitation, the way (s000:w0) of snoop filter 310 stores coherency information which indicates a way w0 of the cache c0 (where c0 represents cache 320, in this example embodiment). Since the set s000 is one of the sets 302 which correspond to the respective sets s0 of caches 320, 330), the indicated way w0 is determined to be, more particularly, that of the set s00 of cache c0.

Additionally or alternatively, the way (s001:w0) of snoop filter 310 stores coherency information which indicates a way w1 of the cache c0. Since the set s001 is one of the sets 302 (which correspond to the respective sets s0 of caches 320, 330), the indicated way w1 is determined to be, more particularly, that of the set s0 of cache 320.

Additionally or alternatively, the way (s100:w1) of snoop filter 310 stores coherency information which indicates a way w0 of the cache c1 (where c1 represents cache 330, in this example embodiment). Since the set s100 is one of the sets 306 (which correspond to the respective sets s2 of caches 320, 330), the indicated way w0 is determined to be, more particularly, that of the set s2 of cache 330.

Additionally or alternatively, the way (s111:w0) of snoop filter 310 stores coherency information which indicates a way w0 of the cache c1 (i.e., cache 330, in this example embodiment). Since the set s111 is one of the sets 308 (which correspond to the respective sets s3 of caches 320, 330), the indicated way w0 is determined to be, more particularly, that of the set s3 of cache 330.

FIG. 4 shows one example of coherency information which is provided in an entry 400 of a snoop filter according to an embodiment. Entry 400 illustrates one example of an embodiment wherein coherency information is provided with a snoop filter which provides a one-to-many correspondence, or a many-to-many correspondence, of one or more cache sets (each of a different respective cache) to multiple snoop filter sets which are to represent those one or more cache sets. By way of illustration and not limitation, snoop filter entry 400 has features of an entry in one of sets 131a, . . . , 131x or of an entry of snoop filter 310, for example.

As shown in FIG. 4, snoop filter entry 400 comprises a field 401 to store tag information which comprises at least part of an address to lookup the corresponding line in a cache set (or "cache line"). Entry 400 further comprises a field 402 to store an identifier of a MESI (or other) coherency state of the data in the corresponding cache line.

Entry 400 further comprises a field 403 to store any of various types of data which are suitable to indicate, for each of one or more cores, whether the core may have a valid version of the corresponding cache line. By way of illustration and not limitation, field 403 comprises a bitmap including bits each for a different respective core, wherein the value of each such bit indicates whether the core may have a valid version of the cache line.

Entry 400 further comprises a field 404 to store mapping information—e.g., including a pointer, a presence vector, or the like—which indicates in which cache array the corresponding line is present. In one embodiment, the mapping information identifies a particular FBS port by which the cache line is to be accessed.

Entry 400 further comprises a field 405 to store a value—such as a least recently used (LRU) metric—which specifies or otherwise indicates a recency of use of the corresponding cache line. In various embodiments, coherency controller 182 (or other suitable logic) updates or otherwise maintains the value in field 405 based on a recency of snoop filter entry 400 being created and/or a recency of a request to access snoop filter entry 400 (or, for example, to access some other snoop filter entry). In an embodiment, maintaining the information in field 405 includes one or more operations which, for example, are adapted from convention techniques to facilitate the identification of a victim entry which is to be evicted from a snoop filter. Such techniques are not limiting on some embodiments and are not detailed herein to avoid obscuring certain features of said embodiments.

Figure 5A:
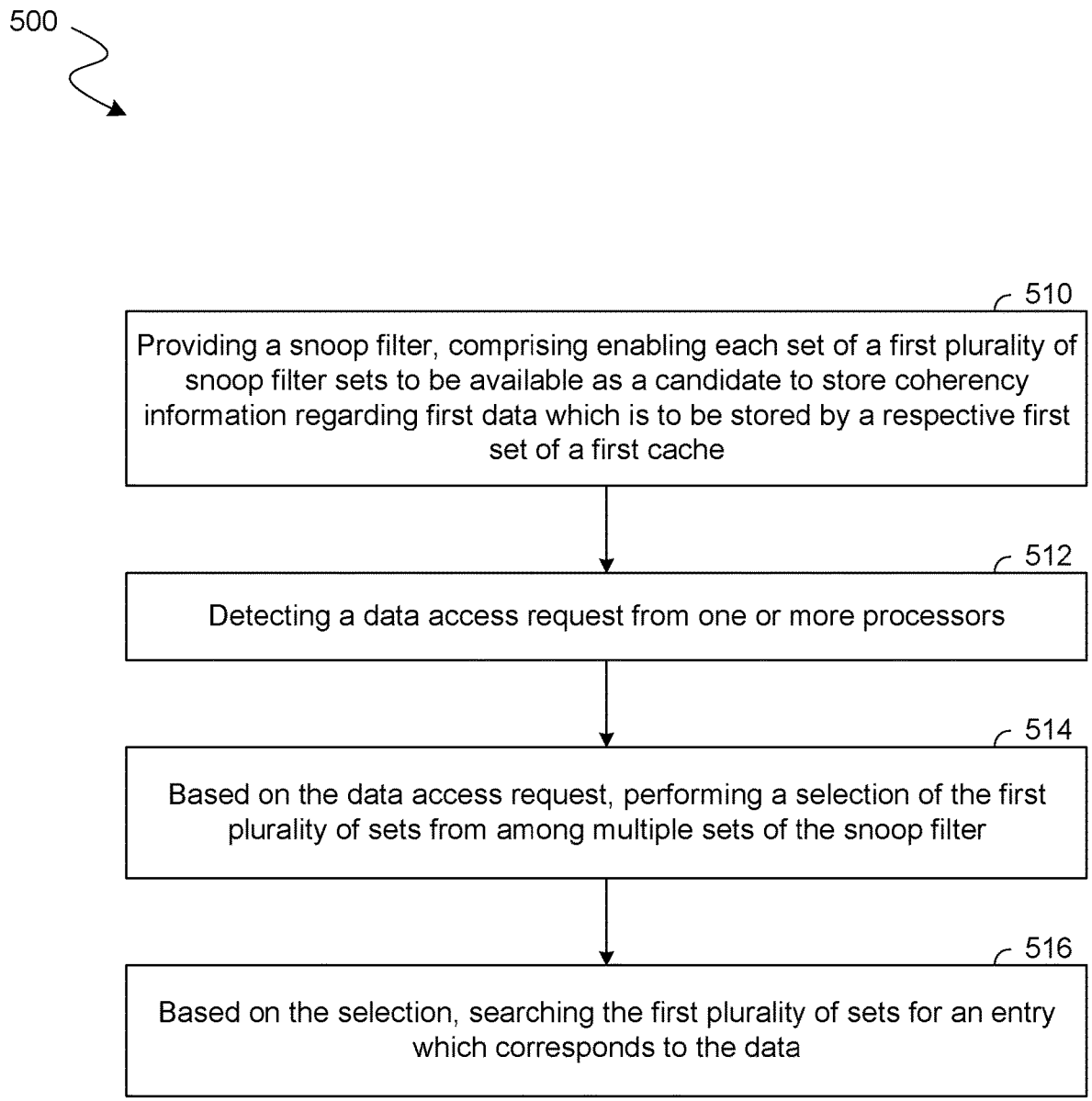

FIG. 5A shows features of a method 500 to provide snoop filter functionality according to an embodiment. Method 500 illustrates one example of an embodiment wherein multiple sets of a snoop filter are provided each to represent a first set of a first cache (and, for example, to further represent the respective first sets of one or more other caches). In some embodiments, method 500 is performed with coherency engine 123 and/or other circuitry of coherency controller 182.

As shown in FIG. 5, method 500 comprises (at 510) providing a snoop filter with a first array of memory cells, wherein the first array comprises a first plurality of sets each comprising respective ways. For example, the plurality of sets corresponds functionally to one of sets 302, sets 304, sets 306, or sets 308. In various embodiments, the providing at 510 comprises enabling each set of the first plurality of sets to be available as a candidate to store coherency information regarding first data which is to be stored by a respective first set of a first cache. For example, in one illustrative embodiment, the first set and the first plurality of sets are (respectively) set s0 of cache 320 and sets 302 of snoop filter 310.

In various embodiments, multiple caches (e.g., including caches 320, 330) each comprise a respective first set, wherein, for each set of the first plurality of sets, any line in the first cache which is to be represented by that each set is to be a line in a respective one of the first sets of the multiple caches. In some embodiments, the first cache further comprises a respective second set, wherein the first array further comprises a second plurality of sets. For example, in one illustrative embodiment, the second set and the second plurality of sets are (respectively) set s1 of cache 320 and sets 304 of snoop filter 310. In one such embodiment, providing the snoop filter at 510 further comprises enabling each set of the second plurality of sets to be available as a candidate to store coherency information regarding second data which is to be stored by the respective second set of the first cache. For example, the multiple caches each comprise a respective second set (as well as the respective first set), wherein, for each set of the second plurality of sets, any line of a cache which is to be represented by the set is to be a line in the respective second sets of the multiple caches.

Method 500 further comprises (at 512) detecting a data access request from one or more processors. Various examples of such a data access request are described herein with reference to FIGS. 6A-6C. Based on the data access request, method 500 (at 514) performs a selection of the first plurality of sets from among multiple sets of the snoop filter. Based on the selection, method 500 (at 516) searches the first plurality of sets for an entry which corresponds to the requested data. For example, multiple tags (e.g., a tag such as one represented in field 401) each correspond to a different respective set of the first plurality of sets, wherein a first tag of the multiple tags comprises a first bit sequence. In one such embodiment, method 500 perform the selection at 514 based on a second bit sequence which is equal to a result of a removal of one or more bits from the first bit sequence—e.g., a removal of a least significant bit from the first bit sequence.

By way of illustration and not limitation, referring again to FIG. 3, sets 302 of snoop filer 310 each correspond to a different respective one of the tag bit sequences "000" and "001." For each of these tag bit sequences, removing (e.g., masking, truncating or otherwise ignoring) the LSBs of the sequence results in a different bit sequence "00" which corresponds to an identifier of the respective sets s0 of caches 320, 330 which are represented by sets 302. Similarly, sets 304 of snoop filer 310 each correspond to a different respective one of the tag bit sequences "010" and "011", wherein—for each of these tag bit sequences— ignoring the LSBs of the sequence results in the bit sequence "01" which corresponds to an identifier of the respective sets s1 of caches 320, 330 which are represented by sets 304.

FIG. 5B shows features of another method 550 to determine a storing of a cache line based on a snoop filter according to an embodiment. Method 550 illustrates an embodiment wherein a cache line is designated, based on an evaluation of coherency information at a snoop filter, as a victim line (the data of which is to be replaced or otherwise updated). In some embodiments, method 550 is performed with coherency engine 123 and/or other circuitry of coherency controller 182—e.g., wherein method 550 is part of, or is otherwise based on, method 500.

In the example embodiment shown, method 550 includes or is otherwise based on a determination that a new line of data needs to be cached. For example, based on the data access request, an evaluation is performed to determine which ways from among those of one or more caches—e.g., including caches 112 and/or caches 320, 330—are to be considered as possible candidates for selection as a victim way. Such determining is based on one or more criteria, as described herein.

By way of illustration and not limitation, candidate cache ways are identified based on a class of service (CLOS) criteria—e.g., wherein any cache way which is not related to a particular CLOS is removed from consideration. In some embodiments, an evaluation is then performed to determine whether any of the cache ways under consideration are in an unused state and/or of a vulnerable type. If an unused cache way is detected, some embodiments use that unused cache way for a receiving the new line of data—i.e., wherein no currently-used cache way needs to be victimized. If a vulnerable cache way is detected, some embodiments select that cache way for victimization, and update the mapping information of a snoop filter entry which corresponds to the vulnerable cache way. If neither an unused cache way or a vulnerable cache is identified, some embodiments, perform operations of method 550 to determine a victim cache way.

For example, as shown in FIG. 5, method 550 comprises (at 560) selecting a first way from among all of multiple cache ways which, according to some predetermined one or more criteria, are available for consideration. For example, the one or more criteria include a classification of a way as being unused, and/or a classification of the way as being otherwise vulnerable. In an embodiment, the selecting at 560 comprises determining whether any one cache way of the multiple cache ways is represented by a snoop filter entry which indicates a recency of use that is at or below some predetermined threshold level (e.g., an LRU value of "00"). If the multiple cache ways include one such way, then that cache way is selected at 560. Otherwise, a find first algorithm (starting at a way 0, for example) is used to select the first way at 560—e.g., wherein the find first algorithm is adapted, for example, from any of various conventional cache management techniques.

Method 550 further comprises (at 562) selecting a second way from among only those particular cache ways of the multiple cache ways which are each represented by a first snoop filter set that is indicated by the data access request. For example, the selecting at 562 comprises determining whether any one way of those particular cache ways is represented by a snoop filter entry which indicates a recency of use that is at or below some predetermined threshold level. If those particular cache ways include one such way, then that way is selected at 562. Otherwise, a find first algorithm (starting at a way 0, for example) is used to select the first way at 562 from among those particular cache ways.

Where it is determined that only a cache victim is needed (and not also a snoop filter victim), then method 550 (at 564) selects the first way over the second way to be a victim. Where it is instead determined that both a cache victim and a snoop filter victim is needed, method 550 (at 566) selects the second way over the first way to be the victim.

Figure 6A:
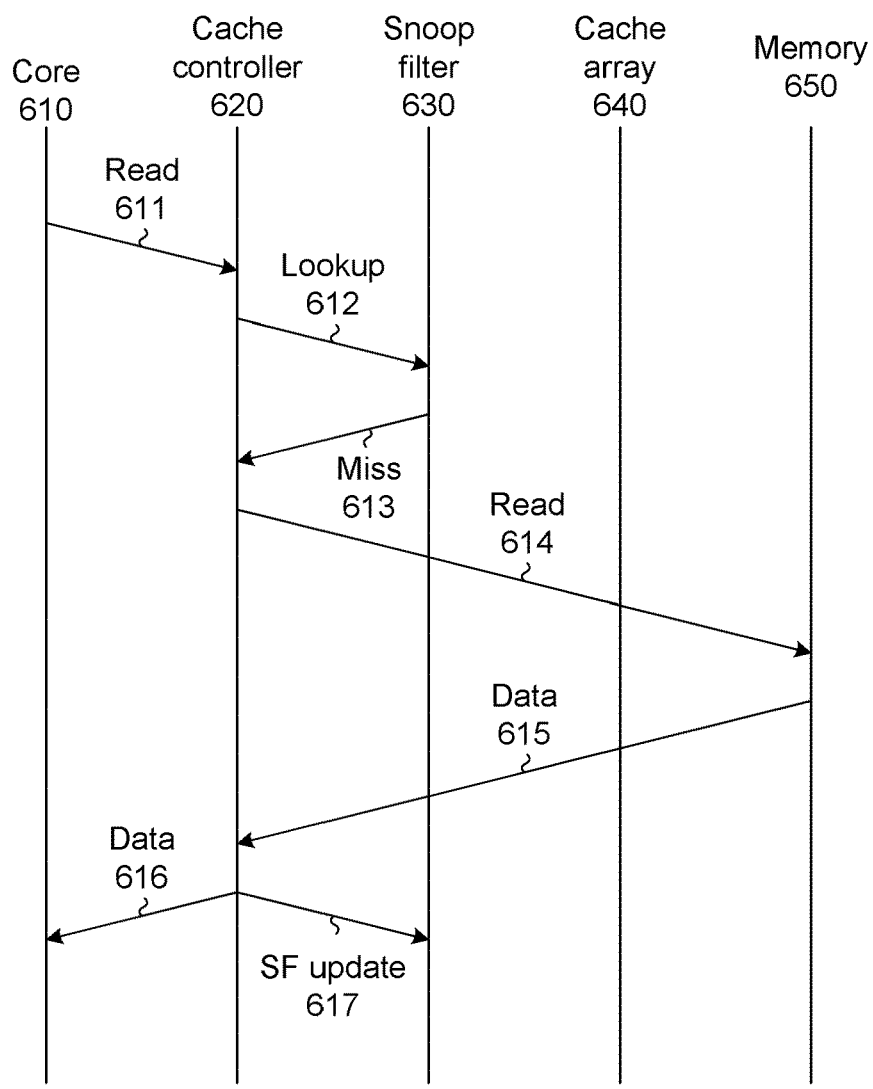
FIGS. 6A through 6C show swim-lane diagrams each illustrating respective features of a respective sequence of operations which access a snoop filter according to a corresponding embodiment.
Figure 6B:
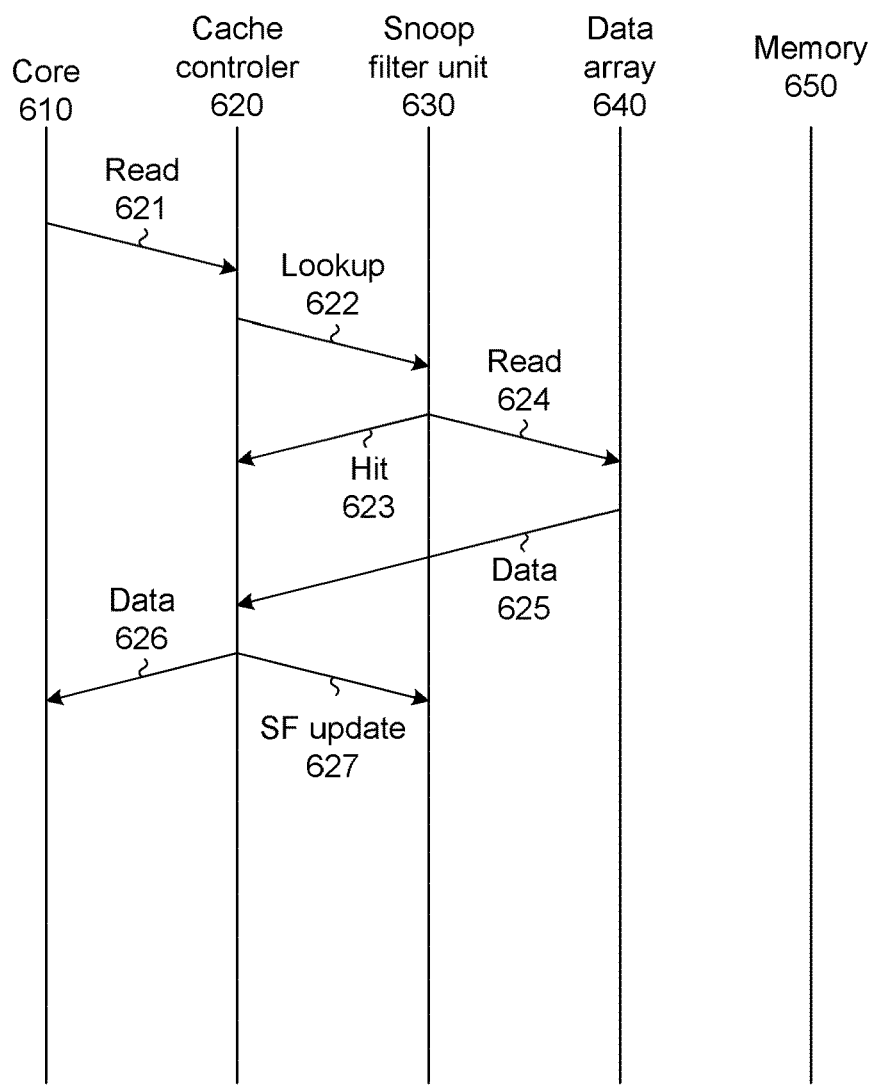
Figure 6C:
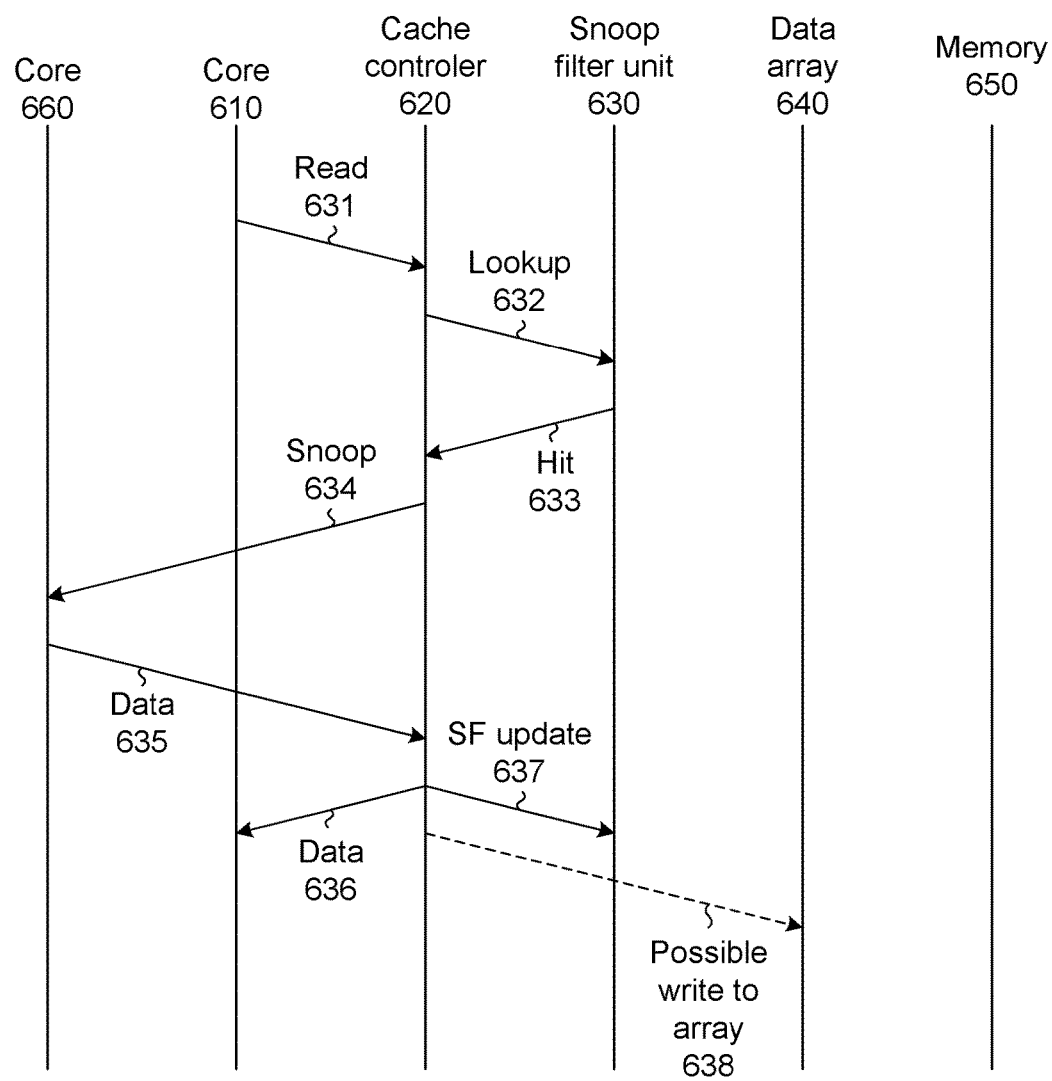

FIGS. 6A-6C show various sequences 600-602 of respective communications—each between various ones of a core 610, a cache controller 620, a snoop filter controller, a cache array 640, and a memory 650—to facilitate snoop filter functionality according to an embodiment. Sequences 600-602 variously illustrate communications which access a snoop filter which is operated according to a one-to-many correspondence, or a many-to-many correspondence, of one or more cache sets (each of a different respective cache) to multiple snoop filter sets which are to represent those one or more cache sets. By way of illustration and not limitation, core 610 is a core of one of processors 111 and cache array 640 is one of caches 112—e.g., wherein cache controller 620, snoop filter 630, and memory 650 correspond functionally to coherency controller 182, snoop filter 130, and memory 115 (respectively). In one example embodiment, one or more of sequences 600-602 include operations of method 500.

In the illustrative scenario of sequence 600, core 610 generates a read request 611 which includes, or is otherwise communicated in association with, an address for a line of data which is to be the target of read request 611. Sequence 600 is performed to access some version of the requested data—e.g., wherein one of cache array 640 or memory 650 includes said version.

For example, cache controller 620 is coupled to receive, snoop or otherwise detect request 611, and to identify some or all of the corresponding address information. Based on such address information, cache controller 620 participates in a lookup 612 to determine whether snoop filter 630 includes an entry which corresponds to the requested data. In various embodiments, multiple sets of snoop filter 630 are each configured to represent a single set of cache array 640—e.g., wherein lookup 612 accesses one or more (e.g., each) of the multiple sets to determine whether any way of the multiple sets currently includes an entry corresponding to the requested data. In the example scenario shown, a miss message 613 is generated to indicate to cache controller 620 that no such corresponding entry has been found by the lookup 612 of snoop filter 630.

Based on miss message 613, cache controller 620 sends a request 614 to read the targeted data from memory 650. Based on read request 614, memory 650 provides a communication 615 of the requested data to cache controller 620, which then sends the data in a communication 616 to core 610. Further based on communication 615, cache controller 620 sends another message 617 to update snoop filter 630—e.g., by adding to snoop filter 630 an entry for the data provided to core 610 via communication 616.

Additionally or alternatively, another sequence 601 includes a read request 621 and a lookup 622 which (for example) correspond functionally to read request 611 and lookup 612, respectively. In the example scenario shown by sequence 601, a hit message 623 is generated to indicate to cache controller 620 that lookup 622 has hit an entry of snoop filter 630 which corresponds to the data targeted by read request 621. This hit results in a request 624 to read from the line of cache array 640 which is indicated by the snoop filter entry hit by lookup 622. Based on read request 624, cache array 640 provides a communication 625 of the requested data to cache controller 620, which then sends the data in a communication 626 to core 610. In various embodiments, cache controller 620 further receives a message 623 which identifies the occurrence of the hit from lookup 622. In one such embodiment, based on hit message 623 (and/or based on communication 625), cache controller 620 sends another message 627 to update snoop filter 630—e.g., by updating a value indicating a recency of use of the entry which was hit by lookup 622.

Additionally or alternatively, another sequence 602 includes a read request 631 and a lookup 632 which (for example) correspond functionally to read request 621 and lookup 622, respectively. In sequence 602, a hit message 633 indicates to cache controller 620 that lookup 632 has hit an entry of snoop filter 630 which corresponds to the data targeted by read request 631. In this particular scenario, the identified entry of snoop filter 630 points to or otherwise indicates that a core 660—other than core 610 (that is, other than the source of read request 631)—has a valid copy of the requested data. This hit results in a message 634 to snoop or otherwise access the cached version of the data from core 660.

Based on snoop message 634, core 660 provides a communication 635 of the requested data to cache controller 620, which then sends the data in a communication 636 to core 610. In various embodiments, cache controller 620 further receives a message 633 which identifies the occurrence of the hit from lookup 632. In one such embodiment, based on hit message 633 (and/or based on communication 635), cache controller 620 sends another message 637 to update snoop filter 630—e.g., by updating a value indicating a recency of use of the entry which was hit by lookup 632 and/or by updating an identifier of which core has a current version of the requested data. In various embodiments, cache controller 620 further provides a message 638 to store a version of the requested data to a line in cache array 640.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
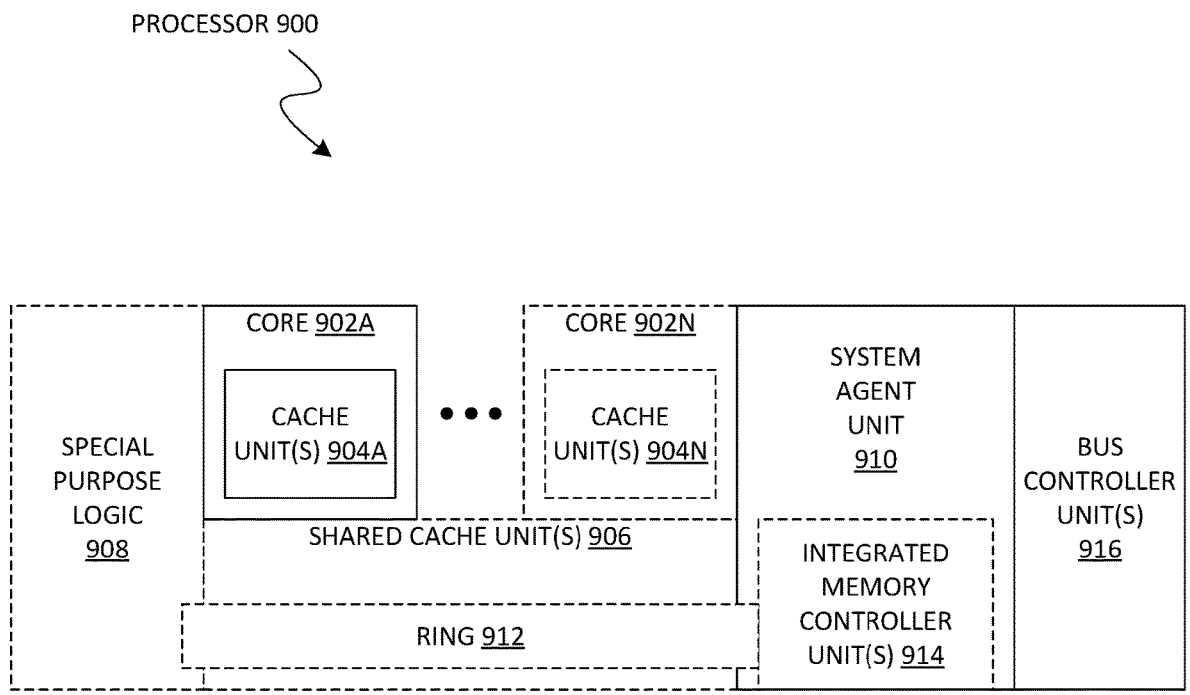
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10 through 13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
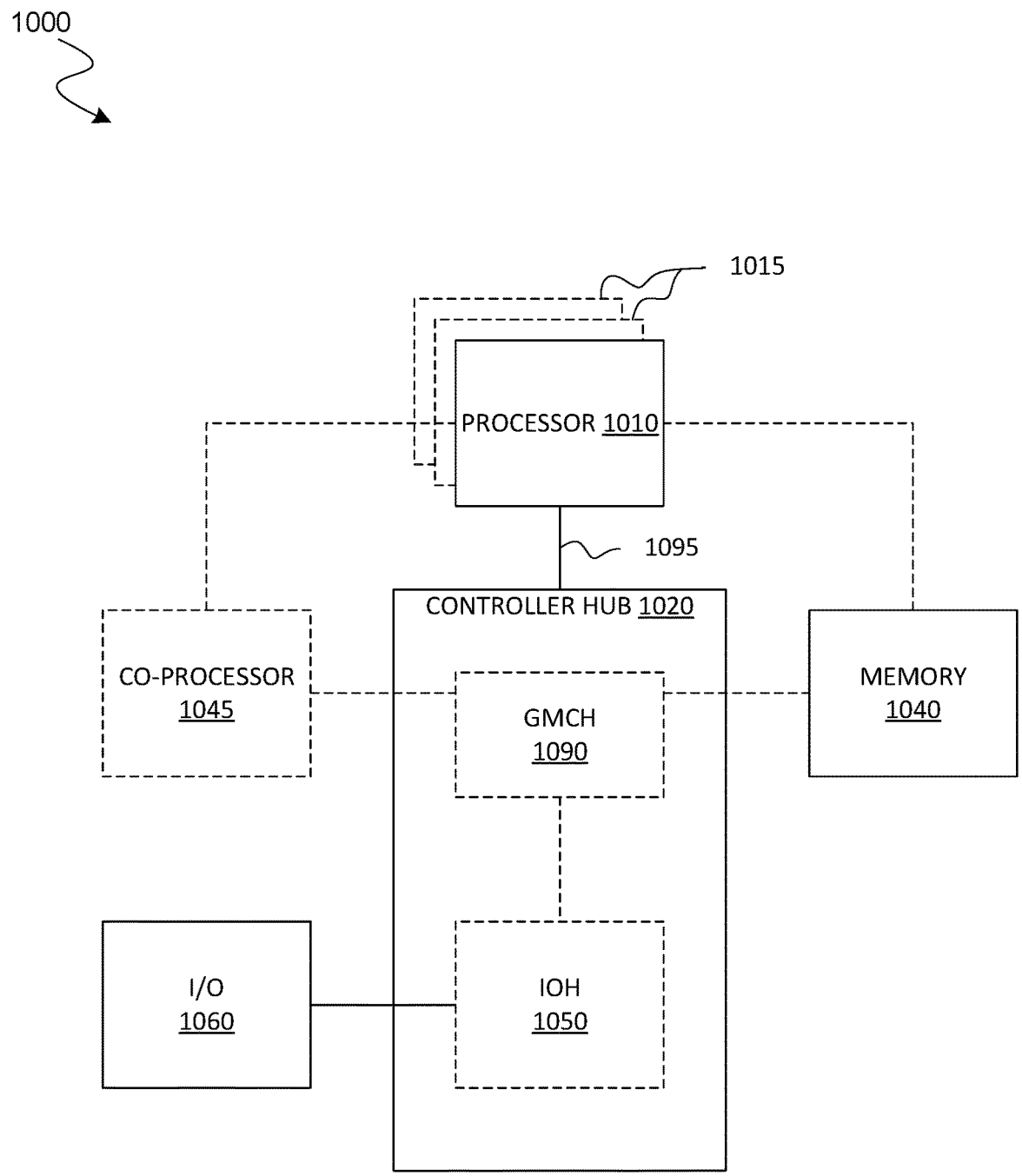
FIGS. 10 through 13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
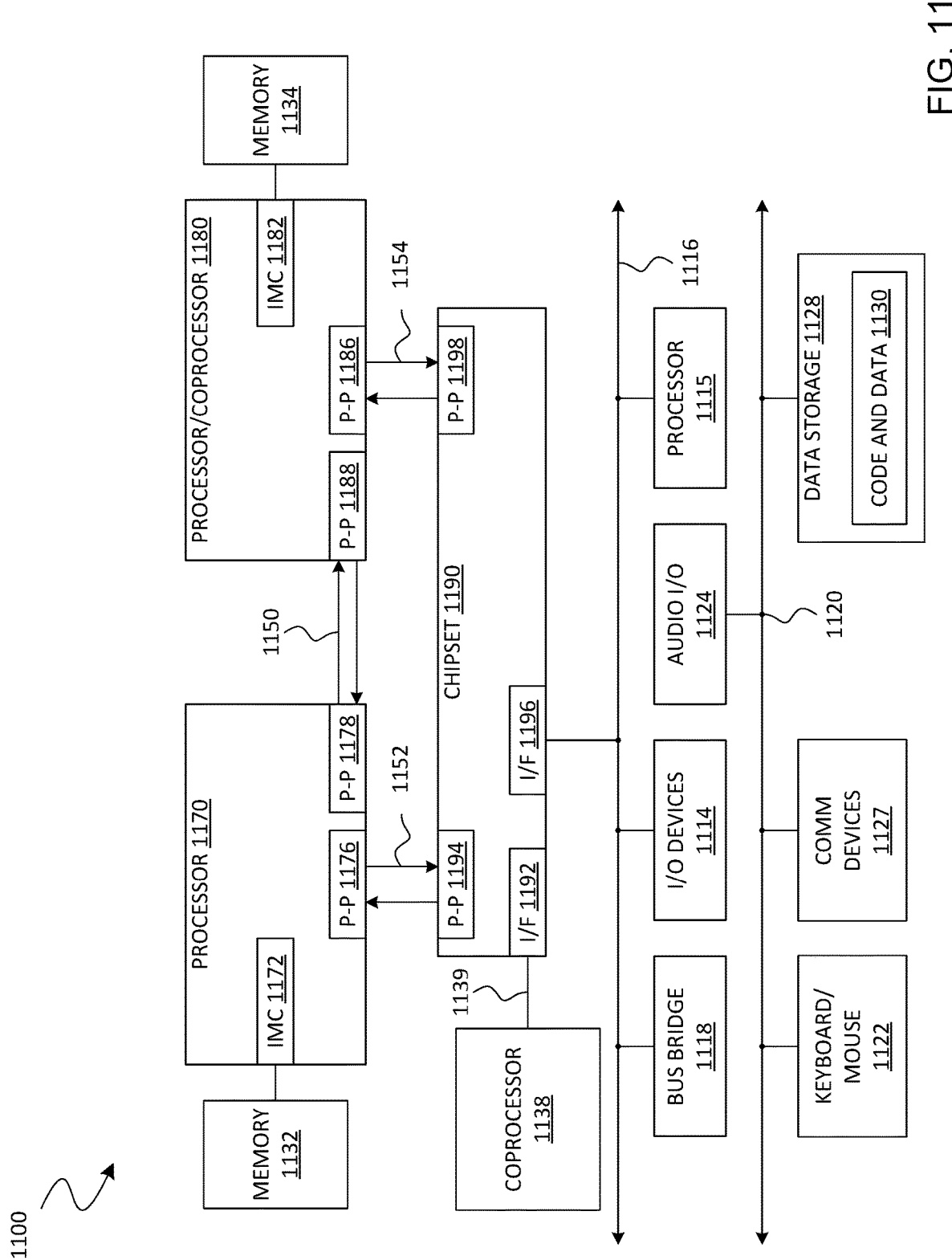

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
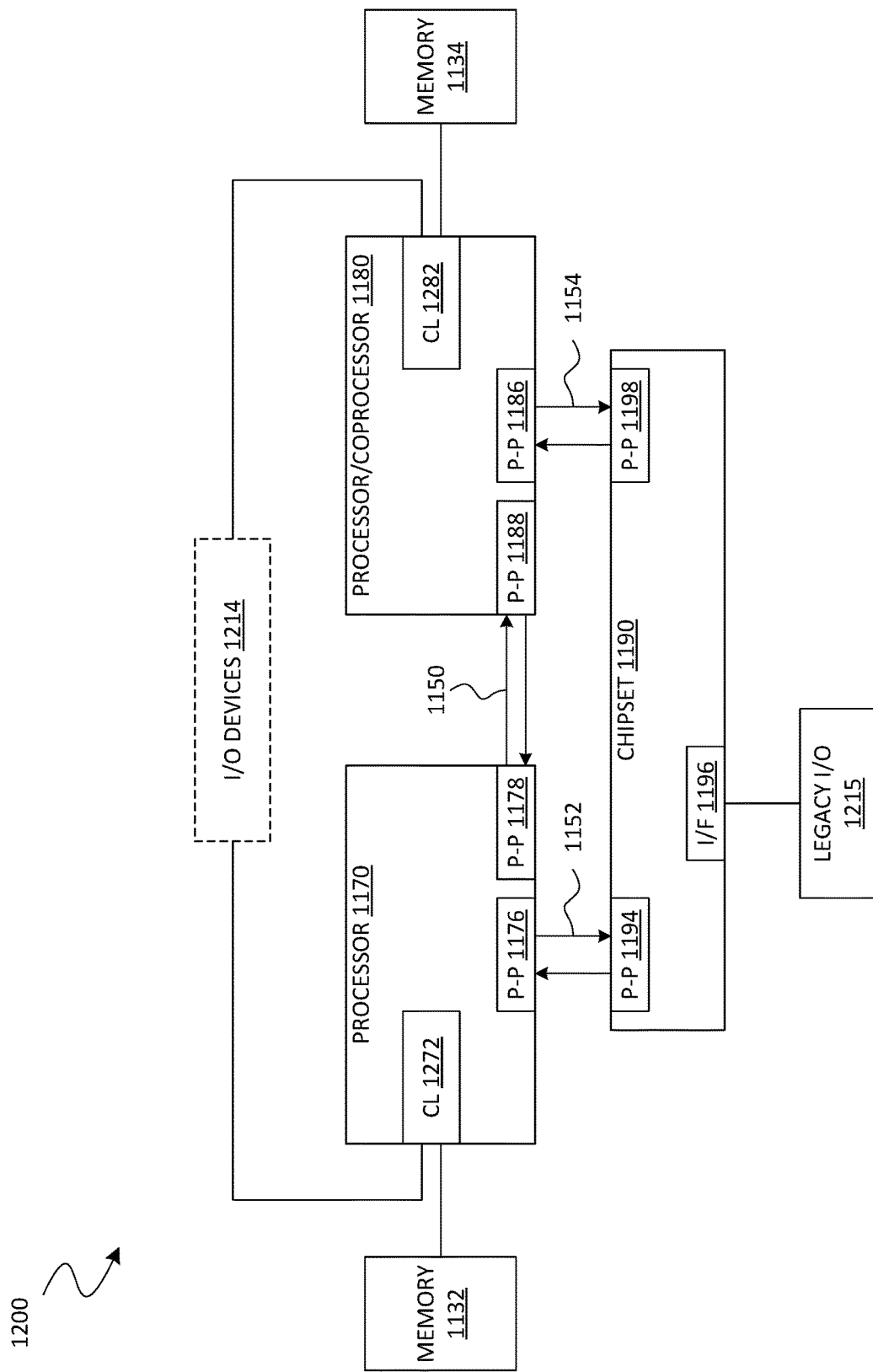

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
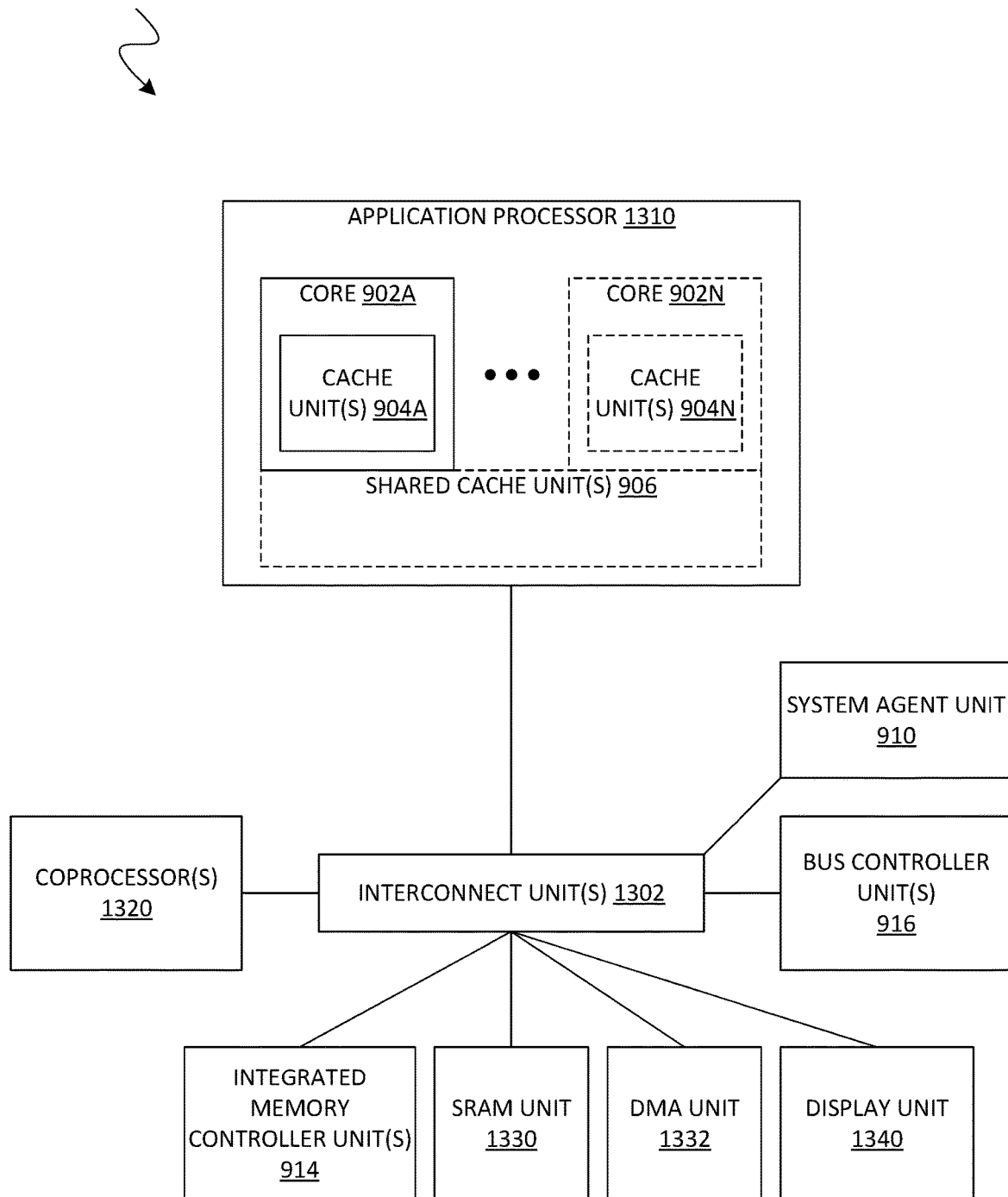

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
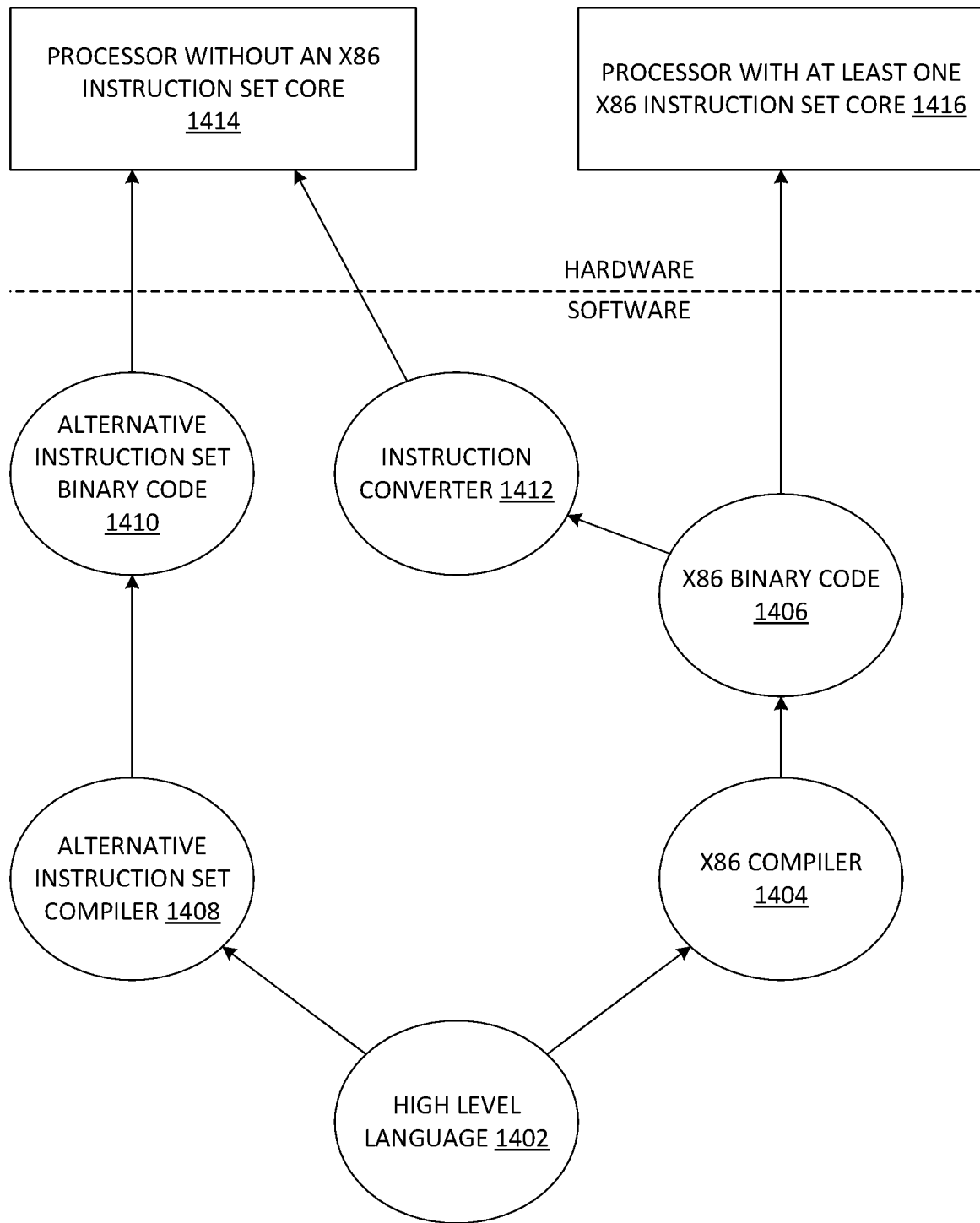
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Techniques and architectures for supporting snoop filter functionality are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a device comprises one or more ports to couple the device to one or more processors comprising a first cache, a first array of memory cells, wherein the first array comprises a first plurality of sets each comprising respective ways, and first circuitry coupled to the one or more ports and to the first array, the first circuitry to provide a snoop filter with the first array, comprising the first circuitry to enable each set of the first plurality of sets to be available as a candidate to store coherency information regarding first data which is to be stored by a respective first set of the first cache.

In one or more second embodiments, further to the first embodiment, multiple caches of the one or more processors comprise the first cache, wherein the multiple caches each comprise a respective first set, and wherein, for each set of the first plurality of sets, any line in the first cache which is to be represented by the set is to be a line in the respective first sets of the multiple caches.

In one or more third embodiments, further to the second embodiment, the first cache further comprises a respective second set, wherein the first array further comprises a second plurality of sets, and wherein the first circuitry to provide the snoop filter with the first array further comprises the first circuitry to enable each set of the second plurality of sets to be available as a candidate to store coherency information regarding second data which is to be stored by the respective second set of the first cache.

In one or more fourth embodiments, further to the third embodiment, the multiple caches each comprise a respective second set, and wherein, for each set of the second plurality of sets, any line of a cache which is to be represented by the set is to be a line in the respective second sets of the multiple caches.

In one or more fifth embodiments, further to the first embodiment or the second embodiment, the first cache further comprises a respective second set, wherein the first array further comprises a second plurality of sets, and wherein the first circuitry to provide the snoop filter with the first array further comprises the first circuitry to enable each set of the second plurality of sets to be available as a candidate to store coherency information regarding second data which is to be stored by the respective second set of the first cache.

In one or more sixth embodiments, further to any of the first, second, or fifth embodiments, the first circuitry is further to detect a data access request from the one or more processors, based on the data access request, perform a selection of the first plurality of sets from among multiple sets of the snoop filter, and based on the selection, search the first plurality of sets for an entry which corresponds to the data.

In one or more seventh embodiments, further to the sixth embodiment, multiple tags each correspond to a different respective set of the first plurality of sets, wherein a first tag of the multiple tags comprises a first bit sequence, wherein the first circuitry is to perform the selection based on a second bit sequence which is equal to a result of a removal of one or more bits from the first bit sequence.

In one or more eighth embodiments, further to the seventh embodiment, the second bit sequence is equal to a result of a removal of a least significant bit from the first bit sequence.

In one or more ninth embodiments, further to any of the first, second, or fifth embodiments, the first circuitry is further to identify a location, in multiple caches, which is to receive data, comprising the first circuitry to select a first way from among all of multiple ways of the multiple caches, wherein the multiple ways each meet one or more criteria, select a second way from among only those of the multiple ways which are each represented by a first set of the snoop filter, where it is determined that only a cache victim is needed, select the first way over the second way to be a victim, and where it is determined that both a cache victim and a snoop filter victim is needed, select the second way over the first way to be the victim.

In one or more tenth embodiments, a method comprises providing a snoop filter with a first array of memory cells, wherein the first array comprises a first plurality of sets each comprising respective ways, wherein providing the snoop filter comprises enabling each set of the first plurality of sets to be available as a candidate to store coherency information regarding first data which is to be stored by a respective first set of a first cache, detecting a data access request from one or more processors, based on the data access request, performing a selection of the first plurality of sets from among multiple sets of the snoop filter, and based on the selection, searching the first plurality of sets for an entry which corresponds to the data.

In one or more eleventh embodiments, further to the tenth embodiment, multiple caches of the one or more processors comprise the first cache, wherein the multiple caches each comprise a respective first set, and wherein, for each set of the first plurality of sets, any line in the first cache which is represented by the set is a line in the respective first sets of the multiple caches.

In one or more twelfth embodiments, further to the eleventh embodiment, the first cache further comprises a respective second set, wherein the first array further comprises a second plurality of sets, and wherein providing the snoop filter with the first array further comprises enabling each set of the second plurality of sets to be available as a candidate to store coherency information regarding second data which is to be stored by the respective second set of the first cache.

In one or more thirteenth embodiments, further to the twelfth embodiment, the multiple caches each comprise a respective second set, and wherein, for each set of the second plurality of sets, any line of a cache which is to be represented by the set is to be a line in the respective second sets of the multiple caches.

In one or more fourteenth embodiments, further to the tenth embodiment or the eleventh embodiment, the first cache further comprises a respective second set, wherein the first array further comprises a second plurality of sets, and wherein providing the snoop filter with the first array further comprises enabling each set of the second plurality of sets to be available as a candidate to store coherency information regarding second data which is to be stored by the respective second set of the first cache.

In one or more fifteenth embodiments, further to any of the tenth, eleventh, or fourteenth embodiments, multiple tags each correspond to a different respective set of the first plurality of sets, wherein a first tag of the multiple tags comprises a first bit sequence, wherein the selection is performed based on a second bit sequence which is equal to a result of a removal of one or more bits from the first bit sequence.

In one or more sixteenth embodiments, further to the fifteenth embodiment, the second bit sequence is equal to a result of a removal of a least significant bit from the first bit sequence.

In one or more seventeenth embodiments, further to any of the tenth, eleventh, or fourteenth embodiments, the method further comprises identifying a location, in multiple caches, which is to receive data, wherein identifying the location comprises selecting a first way from among all of multiple ways of the multiple caches, wherein the multiple ways each meet one or more criteria, selecting a second way from among only those of the multiple ways which are each represented by a first set of the snoop filter, where it is determined that only a cache victim is needed, selecting the first way over the second way to be a victim, and where it is determined that both a cache victim and a snoop filter victim is needed, selecting the second way over the first way to be the victim.

In one or more eighteenth embodiments, a system comprises one or more processors comprising a first cache, an integrated circuit (IC) coupled to the one or more processors via one or more ports, the IC comprising a first array of memory cells, wherein the first array comprises a first plurality of sets each comprising respective ways, and first circuitry coupled to the one or more ports and to the first array, the first circuitry to provide a snoop filter with the first array, comprising the first circuitry to enable each set of the first plurality of sets to be available as a candidate to store coherency information regarding first data which is to be stored by a respective first set of the first cache, and a display device coupled to the one or more processors, the display device to display an image based on the first data.

In one or more nineteenth embodiments, further to the eighteenth embodiment, multiple caches of the one or more processors comprise the first cache, wherein the multiple caches each comprise a respective first set, and wherein, for each set of the first plurality of sets, any line in the first cache which is to be represented by the set is to be a line in the respective first sets of the multiple caches.

In one or more twentieth embodiments, further to the nineteenth embodiment, the first cache further comprises a respective second set, wherein the first array further comprises a second plurality of sets, and wherein the first circuitry to provide the snoop filter with the first array further comprises the first circuitry to enable each set of the second plurality of sets to be available as a candidate to store coherency information regarding second data which is to be stored by the respective second set of the first cache.

In one or more twenty-first embodiments, further to the twentieth embodiment, the multiple caches each comprise a respective second set, and wherein, for each set of the second plurality of sets, any line of a cache which is to be represented by the set is to be a line in the respective second sets of the multiple caches.

In one or more twenty-second embodiments, further to the eighteenth embodiment or the nineteenth embodiment, the first cache further comprises a respective second set, wherein the first array further comprises a second plurality of sets, and wherein the first circuitry to provide the snoop filter with the first array further comprises the first circuitry to enable each set of the second plurality of sets to be available as a candidate to store coherency information regarding second data which is to be stored by the respective second set of the first cache.

In one or more twenty-third embodiments, further to any of the eighteenth embodiment or the nineteenth embodiment, the first circuitry is further to detect a data access request from the one or more processors, based on the data access request, perform a selection of the first plurality of sets from among multiple sets of the snoop filter, and based on the selection, search the first plurality of sets for an entry which corresponds to the data.

In one or more twenty-fourth embodiments, further to the twenty-third embodiment, multiple tags each correspond to a different respective set of the first plurality of sets, wherein a first tag of the multiple tags comprises a first bit sequence, wherein the first circuitry is to perform the selection based on a second bit sequence which is equal to a result of a removal of one or more bits from the first bit sequence.

In one or more twenty-fifth embodiments, further to the twenty-fourth embodiment, the second bit sequence is equal to a result of a removal of a least significant bit from the first bit sequence.

In one or more twenty-sixth embodiments, further to the eighteenth embodiment or the nineteenth embodiment, the first circuitry is further to identify a location, in multiple caches, which is to receive data, comprising the first circuitry to select a first way from among all of multiple ways of the multiple caches, wherein the multiple ways each meet one or more criteria, select a second way from among only those of the multiple ways which are each represented by a first set of the snoop filter, where it is determined that only a cache victim is needed, select the first way over the second way to be a victim, and where it is determined that both a cache victim and a snoop filter victim is needed, select the second way over the first way to be the victim.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    one or more ports to couple the device to one or more processors comprising a first cache;
    a first array of memory cells, wherein the first array comprises a first plurality of sets each comprising respective ways; and
    first circuitry coupled to the one or more ports and to the first array, the first circuitry to provide a snoop filter with the first array, comprising the first circuitry to enable each set of the first plurality of sets to be available as a candidate to store coherency information regarding first data which is to be stored by a respective first set of the first cache;
    wherein:
        the first cache further comprises a respective second set;
        the first array further comprises a second plurality of sets; and
        the first circuitry to provide the snoop filter with the first array further comprises the first circuitry to enable each set of the second plurality of sets to be available as a candidate to store coherency information regarding second data which is to be stored by the respective second set of the first cache.

2. The device of claim 1, wherein multiple caches of the one or more processors comprise the first cache;
    wherein the multiple caches each comprise a respective first set; and
    wherein, for each set of the first plurality of sets, any line in the first cache which is to be represented by the set is to be a line in the respective first sets of the multiple caches.

3. The device of claim 2, wherein the multiple caches each comprise a respective second set; and
    wherein, for each set of the second plurality of sets, any line of a cache which is to be represented by the set is to be a line in the respective second sets of the multiple caches.

4. The device of claim 1, wherein the first circuitry is further to:
    detect a data access request from the one or more processors;
    based on the data access request, perform a selection of the first plurality of sets from among multiple sets of the snoop filter; and
    based on the selection, search the first plurality of sets for an entry which corresponds to the data access request.

5. The device of claim 4, wherein multiple tags each correspond to a different respective set of the first plurality of sets;
    wherein a first tag of the multiple tags comprises a first bit sequence;
    wherein the first circuitry is to perform the selection based on a second bit sequence which is equal to a result of a removal of one or more bits from the first bit sequence.

6. The device of claim 5, wherein the second bit sequence is equal to a result of a removal of a least significant bit from the first bit sequence.

7. The device of claim 1, the first circuitry further to identify a location, in multiple caches, which is to receive data, comprising the first circuitry to:
    select a first way from among all of multiple ways of the multiple caches, wherein the multiple ways each meet one or more criteria;
    select a second way from among only those of the multiple ways which are each represented by a first set of the snoop filter;
    where it is determined that only a cache victim is needed, select the first way over the second way to be a victim; and
    where it is determined that both a cache victim and a snoop filter victim is needed, select the second way over the first way to be the victim.

8. A method comprising:
  providing a snoop filter with a first array of memory cells, wherein the first array comprises a first plurality of sets each comprising respective ways, wherein providing the snoop filter comprises enabling each set of the first plurality of sets to be available as a candidate to store coherency information regarding first data which is to be stored by a respective first set of a first cache;
  detecting a data access request from one or more processors;
  based on the data access request, performing a selection of the first plurality of sets from among multiple sets of the snoop filter; and
  based on the selection, searching the first plurality of sets for an entry which corresponds to the data access request;
  wherein:
    the first cache further comprises a respective second set;
    the first array further comprises a second plurality of sets; and
    providing the snoop filter with the first array further comprises enabling each set of the second plurality of sets to be available as a candidate to store coherency information regarding second data which is to be stored by the respective second set of the first cache.

9. The method of claim 8, wherein multiple caches of the one or more processors comprise the first cache;
  wherein the multiple caches each comprise a respective first set; and
  wherein, for each set of the first plurality of sets, any line in the first cache which is represented by the set is a line in the respective first sets of the multiple caches.

10. The method of claim 8, wherein multiple tags each correspond to a different respective set of the first plurality of sets;
  wherein a first tag of the multiple tags comprises a first bit sequence;
  wherein the selection is performed based on a second bit sequence which is equal to a result of a removal of one or more bits from the first bit sequence.

11. The method of claim 8, further comprising identifying a location, in multiple caches, which is to receive data, wherein identifying the location comprises:
  selecting a first way from among all of multiple ways of the multiple caches, wherein the multiple ways each meet one or more criteria;
  selecting a second way from among only those of the multiple ways which are each represented by a first set of the snoop filter;
  where it is determined that only a cache victim is needed, selecting the first way over the second way to be a victim; and
  where it is determined that both a cache victim and a snoop filter victim is needed, selecting the second way over the first way to be the victim.

12. A system comprising:
  one or more processors comprising a first cache;
  an integrated circuit (IC) coupled to the one or more processors via one or more ports, the IC comprising:
    a first array of memory cells, wherein the first array comprises a first plurality of sets each comprising respective ways; and
    first circuitry coupled to the one or more ports and to the first array, the first circuitry to provide a snoop filter with the first array, comprising the first circuitry to enable each set of the first plurality of sets to be available as a candidate to store coherency information regarding first data which is to be stored by a respective first set of the first cache;
    wherein the first circuitry is further to identify a location, in multiple caches, which is to receive data, comprising the first circuitry to:
      select a first way from among all of multiple ways of the multiple caches, wherein the multiple ways each meet one or more criteria;
      select a second way from among only those of the multiple ways which are each represented by a first set of the snoop filter;
      where it is determined that only a cache victim is needed, select the first way over the second way to be a victim; and
      where it is determined that both a cache victim and a snoop filter victim is needed, select the second way over the first way to be the victim; and
  a display device coupled to the one or more processors, the display device to display an image based on the first data.

13. The system of claim 12, wherein multiple caches of the one or more processors comprise the first cache;
  wherein the multiple caches each comprise a respective first set; and
  wherein, for each set of the first plurality of sets, any line in the first cache which is to be represented by the set is to be a line in the respective first sets of the multiple caches.

14. The system of claim 13, wherein the first cache further comprises a respective second set;
  wherein the first array further comprises a second plurality of sets; and
  wherein the first circuitry to provide the snoop filter with the first array further comprises the first circuitry to enable each set of the second plurality of sets to be available as a candidate to store coherency information regarding second data which is to be stored by the respective second set of the first cache.

15. The system of claim 12, wherein the first cache further comprises a respective second set;
  wherein the first array further comprises a second plurality of sets; and
  wherein the first circuitry to provide the snoop filter with the first array further comprises the first circuitry to enable each set of the second plurality of sets to be available as a candidate to store coherency information regarding second data which is to be stored by the respective second set of the first cache.

16. The system of claim 12, wherein the first circuitry is further to:
  detect a data access request from the one or more processors;
  based on the data access request, perform a selection of the first plurality of sets from among multiple sets of the snoop filter; and
  based on the selection, search the first plurality of sets for an entry which corresponds to the data access request.

* * * * *